2,849,316

METHOD OF PRODUCING FLAME RESISTANT FIBERBOARD

Edgar A. Lauring, International Falls, Minn., assignor to Minnesota and Ontario Paper Company, Minneapolis, Minn.

No Drawing. Application September 5, 1956
Serial No. 607,987

7 Claims. (Cl. 92—21)

This invention relates to a fire resistant fiber composition board and to a method of rendering fire resistant board-like products.

In the manufacture of fiber composition board a pulp slurry is supplied to a suitable forming apparatus with low concentration of fiber. The fibrous material when it reaches the forming apparatus usually contains less than about 5% of fiber. Much of the water is drained off during the formation of the board. The formed board is subjected to various means of reducing the moisture contents and the board usually contains in excess of 50% of moisture when subjected to the drying operation.

In general there are two methods of adding material to provide integral treated fire resistant fiberboard. One method consists in the addition of inert non-combustible material. This method is not satisfactory as it does not prevent the cellulosic material from burning between the particles of the inert material. The second method consists in incorporating suitable fire resistant chemical or chemicals. The most effective chemical agents are water soluble and when added to a pulp slurry containing in excess of 90% of water there results in great loss of the treating chemicals.

There has been discovered a commercially practical method whereby integral treated fire resistant fiber composition board can be produced without substantial loss of the chemical or chemicals. The board produced by this new method requires less fire resistant material to be added to the slurry and also results in improved fire resistant qualities.

The new method requires the use of a chemical that initially has low solubility in water normally used in the make up of a pulp slurry. Such material must be of a character that during drying an effective fire resistant chemical is produced in situ. Anhydrous borax is such a material and in its original or natural state it is a poor fire retarding agent. The natural mined "Rasorite" which is essentially anhydrous borax is the ideal material. In accordance with the new process a chemical agent such as anhydrous borax is reduced to a size that at least about 75% of the material will fall within the range of about 150 to about 250 mesh with substantially none of the material coarser than 100 mesh and substantially none of the material finer than 300 mesh. The particle size of the material is important in obtaining the desired results and in economical manufacture of internally treated fiberboard and will vary with individual machine setups since the time elements between chemical addition and forming of fiber product is dependent on forming before substantial solvation and hydration of the anhydrous borax. Anhydrous borax which has been subjected to water and a temperature, as occurs in drying wet fiberboard, dissolves then crystallizes out as a solid which is a hydrated borax compound and this material is an excellent fire retarding agent.

In accordance with the new process pulverized anhydrous borax is added to a pulp slurry just prior to the formation of the board or mat. It is preferred that it be added within a period of time not greater than three minutes before formation of the board or mat. The formed board containing the chemical agent is subjected to drying at the time it has 50% or more water content. The initial drying temperature should be within the range of around 325° to around 400° F. so that the temperature of the wet board is at the boiling point, approximately 212° F. The temperature of drying may, after the initial application, be lowered to 200° to 350° F. The total drying time at these temperatures being about two hours or more. Composition board produced in this manner should have a modulus of rupture of about 500 in the machine direction formation. It is to be understood that it is necessary to have a sufficient drying time and temperature so that the anhydrous borax is changed in the board to a hydrated borax compound.

By way of example, if a fiber composition board is to be formed as to provide approximately a one-half inch thick board 18 pounds per cubic foot density and the finished product is to meet class F of commercial standards as relates to flame resistance, anhydrous borax is reduced to the size heretofore described. As the particle size of the treating agent has a definite effect on the efficiency of the product, the pulverized anhydrous borax is fed to the pulp slurry just prior to the formation in an amount sufficient that the finished product will have about 55 pounds per thousand square feet. The formed board is then subjected to various methods of reducing surplus moisture and then dried at a temperature within the range of about 325° to 400° F. and a time not less than about two hours, it being understood that the last portion of the drying may be at a temperature lower than the initial temperature.

If the fiberboard with the integral treatment is to meet the requirements of class C of the Commercial Standards CS42–49 there must be incorporated anhydrous borax in the pulp slurry in an amount which will result in about 65 pounds of material in the finished board, per thousand square feet and about one half inch in thickness, 18 pounds per cubic foot density.

In the satisfactory economical production of fire resistant board the pulverized anhydrous borax should be subjected to certain treatments before being added to the pulp slurry, in part to prevent the fine particles from adhering together and forming lumps and in part to prevent settling or separation from the pulp slurry.

Mechanical dispersions of the anhydrous borax in water before its addition to the pulp slurry and/or the use of protective materials will be helpful in keeping the anhydrous borax within the pulp slurry and at the same time eliminate or substantially eliminate lumping or sticking. Such a protective material may be aluminum stearate, protein, algin and, in some instances, synthetic gums such as carboxylmethyl cellulose.

It is to be understood that the process involving this invention is the addition of a relatively insoluble material to the pulp slurry which is retained in the pulp slurry during formation and is changed during the initial steps of the dryng operation. The material in the drying operation crystallizes out on final drying as hydrated borax compound which is a different material than originally added. It being understood that the anhydrous borax added is not a good flame proofing material while the material in the board after drying, a hydrated borax, is a very good fire retardant.

In general it may be said that about 6% to about 9% of anhydrous borax based on the weight of the fibers, gives a satisfactory flame resisting fiber insulating board.

What is claimed:

1. A method of making a vegetable fibrous board comprising adding finely divided anhydrous borax to the fiber slurry, forming a board within a period of time not greater than about 3 minutes from the time of addition of the finely divided anhydrous borax to the fiber slurry, and then drying the wet board for a time not less than about two hours whereby the anhydrous borax is changed to hydrated borax compound in situ during drying of the wet board.

2. A method of making fire resistant composition board comprising intermingling with a fibrous pulp slurry pulverized anhydrous borax, said pulverized borax being selected in particle size within the approximate range so that about 75% will fall within 150 to 250 mesh, forming a board from the slurry containing the anhydrous borax before substantial solvation and hydration of the said borax, and then drying the wet board at an elevated temperature for not less than about 2 hours to change the anhydrous borax to hydrated borax compound in situ.

3. A method of making fibrous fire retardant composition board which comprises comingling finely divided dispersed anhydrous borax in a fibrous slurry within a period of about three minutes prior to the formation of the board and before substantial solvation and hydration of the said anhydrous borax, forming a board containing about 6 to about 9% of the anhydrous borax based upon the weight of the fibers, then drying the board initially at a temperature of about 325° F. to about 400° F. and then reducing the temperature below that initially applied to complete the drying.

4. A method of making a vegetable fiberboard comprising adding finely divided anhydrous borax to a fiber slurry, said anhydrous borax of a size that about 75% falls within the range of about 150 to about 250 mesh, forming a board immediately after the addition of the anhydrous borax and before substantial solvation and hydration of the said borax, then drying the wet board so that during drying the temperature of the board reaches about 212° F., whereby the anhydrous borax is changed during drying to a hydrated borax in situ.

5. A method of making a vegetable fiberboard comprising adding about 6% to about 9% based upon the weight of the fibers of a finely divided anhydrous borax to a fiber slurry, forming a wet board from said slurry containing the anhydrous borax before substantial solvation and hydration of the said borax, and then drying the board at a temperature initially within the range of about 325° to about 400° F., whereby the anhydrous borax is changed to hydrated borax compound in situ during the drying.

6. A method of making a fire retardant vegetable fiberboard comprising adding a finely divided granular and relatively insoluble borax material to a fiber slurry just prior to the formation of a board, forming a board containing the finely divided granular and insoluble material before substantial solvation and hydration of the said insoluble material, drying the said board by raising the temperature of the wet board during drying to about 212° F. whereby the added material crystallizes out during drying to provide a soluble flame retardant material.

7. Method of making the vegetable fibrous product comprising adding about 6% to about 9% of finely divided anhydrous borax to a fibrous slurry, forming a product within a period of about three minutes from the time of the addition of the anhydrous borax to the fibrous slurry, then drying the said product by raising the temperature during drying to about 212° F., whereby the anhydrous borax is changed in situ during the drying to a soluble flame retardant material.

References Cited in the file of this patent

UNITED STATES PATENTS

| | | |
|---|---|---|
| 1,335,910 | Munroe | Apr. 6, 1920 |
| 1,860,134 | Brown | May 24, 1932 |
| 1,909,193 | Vivas | May 16, 1933 |
| 1,937,679 | Wiener | Dec. 5, 1933 |
| 1,966,437 | Bryant | July 17, 1934 |

FOREIGN PATENTS

| | | |
|---|---|---|
| 551 | Great Britain | of 1735 |
| 16,947 | Great Britain | of 1893 |